(12) United States Patent
Johnson

(10) Patent No.: US 12,183,959 B2
(45) Date of Patent: Dec. 31, 2024

(54) STEAM CONCENTRATION ENERGY CONVERTER

(71) Applicant: JTEC Energy, Inc., Atlanta, GA (US)

(72) Inventor: Lonnie G Johnson, Atlanta, GA (US)

(73) Assignee: JTEC ENERGY, INC., Atlanta, GA (US)

( * ) Notice: Subject to any disclaimer, the term of this patent is extended or adjusted under 35 U.S.C. 154(b) by 480 days.

(21) Appl. No.: 17/193,884

(22) Filed: Mar. 5, 2021

(65) Prior Publication Data

US 2021/0280886 A1    Sep. 9, 2021

Related U.S. Application Data

(60) Provisional application No. 62/986,177, filed on Mar. 6, 2020.

(51) Int. Cl.
*H01M 8/1004*    (2016.01)

(52) U.S. Cl.
CPC .................. *H01M 8/1004* (2013.01)

(58) Field of Classification Search
CPC ....... H01M 14/00; H01M 12/00; F01B 17/04; F01B 2250/001; Y02E 60/50
See application file for complete search history.

(56) References Cited

U.S. PATENT DOCUMENTS

| 4,677,038 A | 6/1987 | Salomon |
| 5,087,534 A | 2/1992 | Ludwig |
| 10,938,053 B2 | 3/2021 | Johnson |
| 2017/0237105 A1 | 8/2017 | Johnson |
| 2018/0166724 A1 | 6/2018 | Johnson |
| 2020/0014053 A1 | 1/2020 | Johnson |

FOREIGN PATENT DOCUMENTS

| EP | 1051768 A1 | 11/2000 |
| JP | 2001176536 A | 6/2001 |
| JP | 2002206775 A | 7/2002 |
| JP | 2005116292 A | 4/2005 |

(Continued)

OTHER PUBLICATIONS

Yamauchi, JP2001176536A—Machine Translation (Year: 2001).*

(Continued)

*Primary Examiner* — Brian R Ohara
*Assistant Examiner* — Patrick Marshall Greene
(74) *Attorney, Agent, or Firm* — Panitch Schwarze Belisario & Nadel LLP

(57) ABSTRACT

A steam concentration energy converter has an array or series of Membrane Electrode Assembly (MEA) cells electrically connected in series. The array of MEA cells is configured as a separator between a high water vapor partial pressure region and a low water vapor partial pressure region. A housing may be utilized to separate the high water vapor partial pressure region from the low water vapor partial pressure region. The array of MEA cells are electrically coupled to a load/controller through an electrical conduit. Each MEA cell has electrodes separated from each other by an ion conductive membrane, which is preferably a proton conductive membrane. The electrodes are electrically coupled to electrical conduit.

15 Claims, 5 Drawing Sheets

(56) References Cited

FOREIGN PATENT DOCUMENTS

WO 9939398 A1 8/1999

OTHER PUBLICATIONS

JP2005116292A—Machine Translation (Year: 2005).*
Can Wu, Yuhang Zhang, Duo Dong, Haiming XIEand Jinghong Li, CO9S8 Nanoparticles Anchored on Nitrogen and Sulfur Dual-doped Carbon Nanosheets as Highly Efficient Bifunctional Electrocatalyst for Oxygen Evolution and Reduction Reactions, Nanoscale, Published Jul. 31, 2017, 10 pages, Royal Society of Chemistry 2017.
Dong Hao, Jianping Shen, Yongping Hou, Yi Zhou, and Hong Wang, Research Article: An Improved Empirical Fuel Cell Polarization Curve Model Based on Review Analysis, Accepted Apr. 18, 2016, Copyright 2016, 11 pages, vol. 2016, Article ID 4109204, Hindawi Publishing Corporation, International Journal of Chemical Engineering, http://dx.doi.org/10.1155/2016/4109204.
Duggan, Michael J., Ionic Conductivity of Tantalum Oxide by rf Sputtering, Solid State Ionics 62, (Jul. 1993) 15-20, 2 pages, Elsevier Science Publishers B.V.
Georgios Zafeiropoulos, Hannah Johnson, Sachin Kinge, Mauritius C.M. van de Sanden, Mihalis N. Tsampas, Solar Hydrogen Generation from Ambient Humidity Using Functionalized Porous Photoanodes, Published Oct. 10, 2019, 32 pages, Dutch Institute For Fundamental Research, Toyota Motor Europe NV/SA, Department of Applied Physics, https://doi.org/10.1021/acsami.9b12236.
Hang Yin and Alex C.K. Yip, A Review on the Production and Purification of Biomass-Derived Hydrogen Using Emerging Membrane Technologies, Catalysts 2017, 7, 297; Published: Oct. 5, 2017, 31 pages, doi:10.3390/catal7100297, www.mdpi.com/journal/catalysts.
Yan Liu, et al., Harvesting Waste Heat Energy by Promoting H+ -ion Concentration Difference with a Fuel Cell Structure, Accepted Dec. 8, 2018, 7 pages, Nano Energy 57 (2019) 101-107, www.elsevier.com/locate/nanoen, https://doi.org/10.1016/j.nanoen.2018.12.022.
M. J. Duggan et al., Ionic Conductivity of Tantalum Oxide by rf Sputtering, Published Dec. 15, 1992, 5 pages, https://www.researchgate.net/publication/222377020_Ionic_conductivity_of_tantalum_oxide_by_rf_sputtering.
Paula DIASand Adelio Mendes, Hydrogen Production from Photoelectrochemical Water Splitting, 2018, 52 pages, Springer Science+Business Media, LLC 2018, R.A. Meyers (ed.), Encyclopedia of Sustanability Science and Technology, https://doi.org/10.1007/978-1-4939-2493-6_957-1.
Photocatalytic Thin Film Materials and Applications, Materion Technical Paper, (date unknown), 16 pages, Materion Microelectronics & Services, www.materion.com/microelectronics.
Sangtae Kim, Umberto Anselmi-Tamburini, Hee Jung Park, Manfred Martin, and Zuhair A. Munir, Unprecedented Room-Temperature Electrical Power Generation Using Nanoscale Fluorite-Structured Oxide Electrolytes, 2008, 4 pages, Advanced Materials.
Ying Wang, et al., Synergistic Mn-Co catalyst Outperforms Pt on High-Rate Oxygen Reduction for Alkaline Polymer Electrolyte Fuel Cells, 2019, 8 pages, Nature Communications (2019), https://doi.org/10.1038/s41467-019-09503-4, www.nature.com/naturecommunications.
Yuqing Meng, Jun Gao, Zeyu Zhao, Jake Amoroso, Jianhua Tong and Kyle S. Brinkman, Review: recent progress in low-temperature proton-conducting ceramics, Published online Apr. 9, 2019, 22 pages, https://doi.org/10.1007/s10853-019-03559-9, J Mater Sci (2019) 54:9291-9312.
International Search Report and Written Opinion issued Jun. 2, 2021 in International Application No. PCT/US2021/021207.
Int'l Preliminary Report on Patentability mailed Sep. 15, 2022 in Int'l Application No. PCT/US2021/021207.
Office Action issued Mar. 31, 2023 in CN Application No. 202180014756X with English Translation.
English Translation of Office Action issued Sep. 11, 2023 in JP Application No. 2022-553157.
Third Office Action issued Apr. 20, 2024 in CN Application No. 202180014756X with English Translation.
Second Office Action issued Nov. 16, 2023 in CN Application No. 202180014756X with English Translation.
Guan, et al., "A Self-Powered Wearable Sweat-Evaporation-Biosensing Analyzer for Building Sports Big Data," Nano Energy, vol. 59, pp. 754-761 (2019).

* cited by examiner

STEAM CONCENTRATION ENERGY CONVERTER

CROSS-REFERENCE TO RELATED APPLICATIONS

Applicant claims the benefit of U.S. Provisional Patent Application Ser. No. 62/986,177 filed Mar. 6, 2020 and entitled "Steam Concentration Energy Converter".

TECHNICAL FIELD

The present invention relates to an energy harvesting device for operating on a steam partial pressure differentials.

BACKGROUND OF THE INVENTION

There are numerous sources of steam pressure differentials. One source may be created by the high concentration of steam in combustion of hydrocarbon fuels relative to the steam concentration (humidity) in ambient air. Steam pressure differentials may also be created by water evaporative cooling systems, such as those used for removing exhausts heat from HVAC systems, power plants, server farms or other systems, including industrial systems. Steam concentration or pressure differentials are also created by body perspiration relative to ambient air. The present invention address the use of steam pressure differential to produce energy.

One example of a pressure differential system is shown in U.S. patent application Ser. Nos. 16/588,962; 16/876,22 and 17/154,769. These systems disclose the generation of electrical power using a membrane electrode assembly for electrochemical reactions. However, these systems require the use of a hygroscopic solution to create the water vapor pressure differential in order for the desired reactions to take place.

Effort has also been put forth towards developing energy harvesting devices that operate on body waste heat as power sources for personal electronics, including implantable medical devices, fitness monitors and even cell phones. Generally, these devices have had limited utility because of the limited amount of power that can be generated through these harvesting devices. These devices typically use conventional semiconductor based thermoelectric converters that operate based on the Seebeck effect. These devices have low efficiency and require a temperature differential in order for them to generate electrical power. Using the few degrees difference between body temperature and ambient air has had limited practicality.

The auto industry also been engaged in efforts to harvest energy. One approach has been the use of semiconductor thermoelectric converters based on the Seebeck effect to harvest energy from exhaust gases. However, existing semiconductor thermoelectric converters provide approximately 6% conversion efficiency at the operating engine exhaust temperatures. Furthermore, the complexity associated with creating the needed temperature differential requirements are cost prohibitive considering the small amount of energy recovered by these systems.

A Thermo-Electrochemical Converter (JTEC) disclosed in U.S. Pat. No. 7,160,639 has also been examined as a means for harvesting energy. Similar to conventional thermoelectric converters, the JTEC requires a temperature differential relative to the engine exhaust heat in order to operate. Although cooling is required to maintain the temperature differential, it is more cost effective than conventional thermoelectric converter because of its higher efficiency and associated higher power output. However, effective operating on very low grade, <50° C., waste heat is extremely difficult.

The challenge with operating on very low temperature heat sources is associated with the fact that even the ideal efficiency, Carnot potential, for small temperature differences is very small and there is little to no margin to allocate for real world losses. For example, the ideal, no losses, efficiency for a heat to electric converter operating on human body heat at 37° C. and rejecting heat to the environment at 25° C. would have an ideal efficiency of only 3.9% without accounting for the actual temperatures difference that the converter would see because of transfer heat temperature differences. Heat transfer losses could easily reduce the efficiency down to 1 to 2%.

Accordingly, it is seen that a need remains for a steam concentration cell that provides an improved approach and method for recovering energy from water vapor pressure differentials, including waste gases and other sources of steam concentration differentials such as animal body perspiration. It is to the provision of such therefore that the present invention is primarily directed.

SUMMARY OF THE INVENTION

A steam concentration energy converter for generating electrical power from a water vapor pressure differential created between a high water vapor partial pressure region and a low water vapor partial pressure region. The steam concentration energy converter comprises an electrical load controller, a housing at least partially separating the high water vapor partial pressure region from the low water vapor partial pressure region, and an ion conductive membrane electrode assembly coupled to the housing and electrically coupled to the electrical load controller. The ion conductive membrane electrode assembly has a first electrode in fluid communication with a high water vapor partial pressure region, a second electrode in fluid communication with a lower water vapor partial pressure region, and an ion conductive membrane positioned between the first electrode and the second electrode. The first electrode oxidizing water within the high water vapor partial pressure region to produce protons and electrons wherein the protons are conducted through the ion conductive membrane to the second electrode. The electrons are routed through an external circuit or load to the second electrode where they recombine with the protons and react with oxygen in a reduction reaction producing water. The membrane electrode assembly includes a barrier layer that allows protons or hydrogen to pass but substantially prevents the passage of molecular water.

BRIEF DESCRIPTION OF THE DRAWINGS

The following detailed description of preferred embodiments of the present invention will be better understood when read in conjunction with the appended drawing. For the purposes of illustrating the invention, there is shown in the drawing an embodiment which is presently preferred. It is understood, however, that the invention is not limited to the precise arrangements and instrumentalities shown.

DETAILED DESCRIPTION OF THE INVENTION

Figure 1:
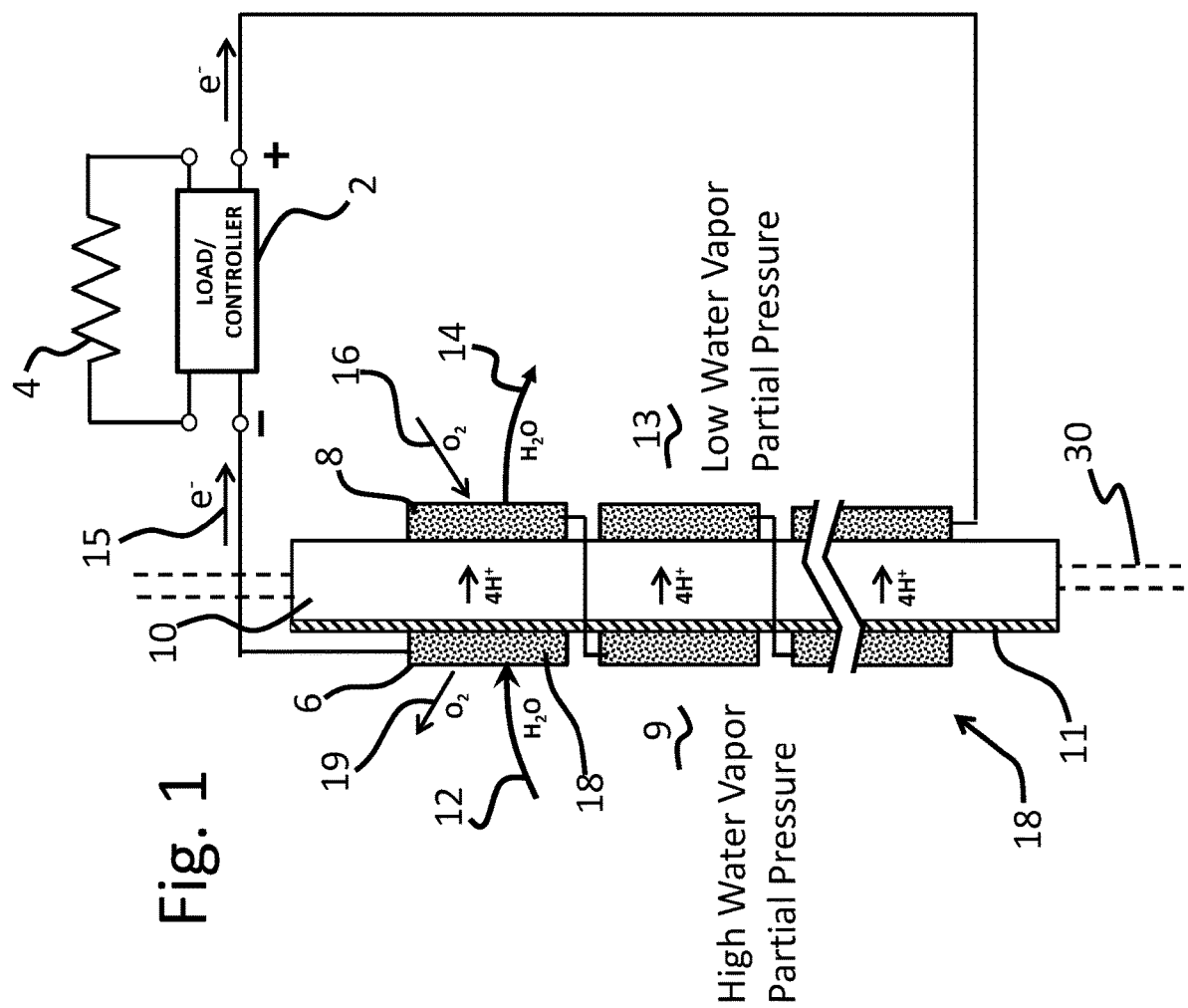
FIG. 1 is a schematic view of a steam concentration energy converter in a preferred form of the invention.

With reference next to the drawings, there is shown a steam concentration energy converter 1 in a preferred form of the invention. U.S. patent application Ser. No. 17/154,769 filed Jan. 21, 2021 and entitled Johnson Ambient Energy Converter is hereby incorporated by reference in its entirety. The steam concentration energy converter 1 has an array or series of Membrane Electrode Assembly (MEA) cells 18 electrically connected together in series. The array of MEA cells 18 is configured as a separator between a high water vapor partial pressure region 9 and a low water vapor partial pressure region 13. Also, a housing 30 may be utilized to separate the high water vapor partial pressure region 9 from the low water vapor partial pressure region 13. The array of MEA cells 18 are electrically coupled to a load/controller 2 through an electrical conduit 3.

Each MEA cell 18 has a high water vapor partial pressure electrodes 6 and a low water vapor partial pressure electrode 8 separated from each other by an ion conductive membrane 10, which is preferably a proton conductive membrane and specifically a hydrogen conductive membrane. The electrodes 6 and 8 are electrically coupled to electrical conduit 3. Preferably, the electrode 6 is made of a platinum material which acts as a catalyst, but may also be made of another material with the addition of a catalyst such as a porous power platinum material.

The load/controller 2 is also coupled to a circuit including a load 4.

In use, the array of MEA cells 18 provides a total voltage that is adequate to meet useful requirements of load/controller 2. Load/controller 2 operates to draw current from the array of MEA cells 18 under preselected voltage level conditions. The resulting extracted power may be stored or supplied directly to load 4 connected thereto. Output power to load/controller 2 is generated as hydrogen is transported from a high water vapor partial pressure region 9 to a low water vapor partial pressure region 13 as driven by the water vapor partial pressure differential. The voltage of the cell is defined by the equation $$V = \frac{RT}{2F} \ln\left(\frac{P6_{H2O}}{P8_{H2O}}\right) * \left(\frac{P8_{O2}}{P6_{O2}}\right)^{1/2}$$

where $P6_{H2O}$ and $P8_{H2O}$ are partial pressures of water at electrodes 6 and 8 respectively, and $P6_{O2}$ and $P8_{O2}$ are the partial pressures of oxygen at electrodes 6 and 8 respectively. R is the universal gas constant, F is Faraday's constant, and T is temperature.

Operation of the steam concentration energy converter 1 can be understood by examining an individual cell of the array of MEA cells 18. Water vapor 12 enters electrode 6 and is oxidized into protons 4H+ with the resulting oxygen $O_2$ being released back to the environment on the high water vapor partial pressure region 9 side, as indicated by arrow 19. Protons (2H+) from the reaction are conducted through membrane 10 to electrode 8, as indicated by arrow 21, as the electrons are routed through load/controller 2 as indicated by arrow 15. The protons and electrons entering electrode 8 react with oxygen in the low water vapor partial pressure region 13 side to produce water which is subsequently released, as indicated by arrow 14. The electrical interconnections of array of MEA cells 18 couple electron current flow between the electrodes 6 and 8 as protons 4H+ are conducted in parallel through the ion conductive membrane 10 of each MEA cell 18 in the array under the water partial pressure differential. Membranes 10 may be a single membrane or an array of individually separate membranes. The net effect is the generation of electrical power by electrochemical reactions driven by the water vapor pressure differential with water entering electrodes 6 on the high water vapor partial pressure region 9 side and exiting (although a different water molecule) at the low water vapor partial pressure region 13 side at electrodes 8.

Ideally, the ion conductive membrane(s) 10 has high barrier properties and prevents the migration of water molecules to the low water vapor partial pressure region 13 side without being electrolyzed. A thin ion conductive barrier 11 may be included to prevent such migration. Many proton conductive membrane materials, such as that sold under the tradename Nafion made by E. I. DuPont De Nemours and Company of Wilmington, Del., are themselves hygroscopic and require water as a necessary component to promote ion conduction. Ion conductive barrier 11 prevents water from passing through or from being absorbed or condensing into the membrane without being electrolyzed. The ion conductive barrier 11 may also be a hydrogen permeable metal such as palladium or tantalum or it may be a proton conductive barrier material such as yttrium-doped barium zirconate, YBaZrO3.

Figure 2:
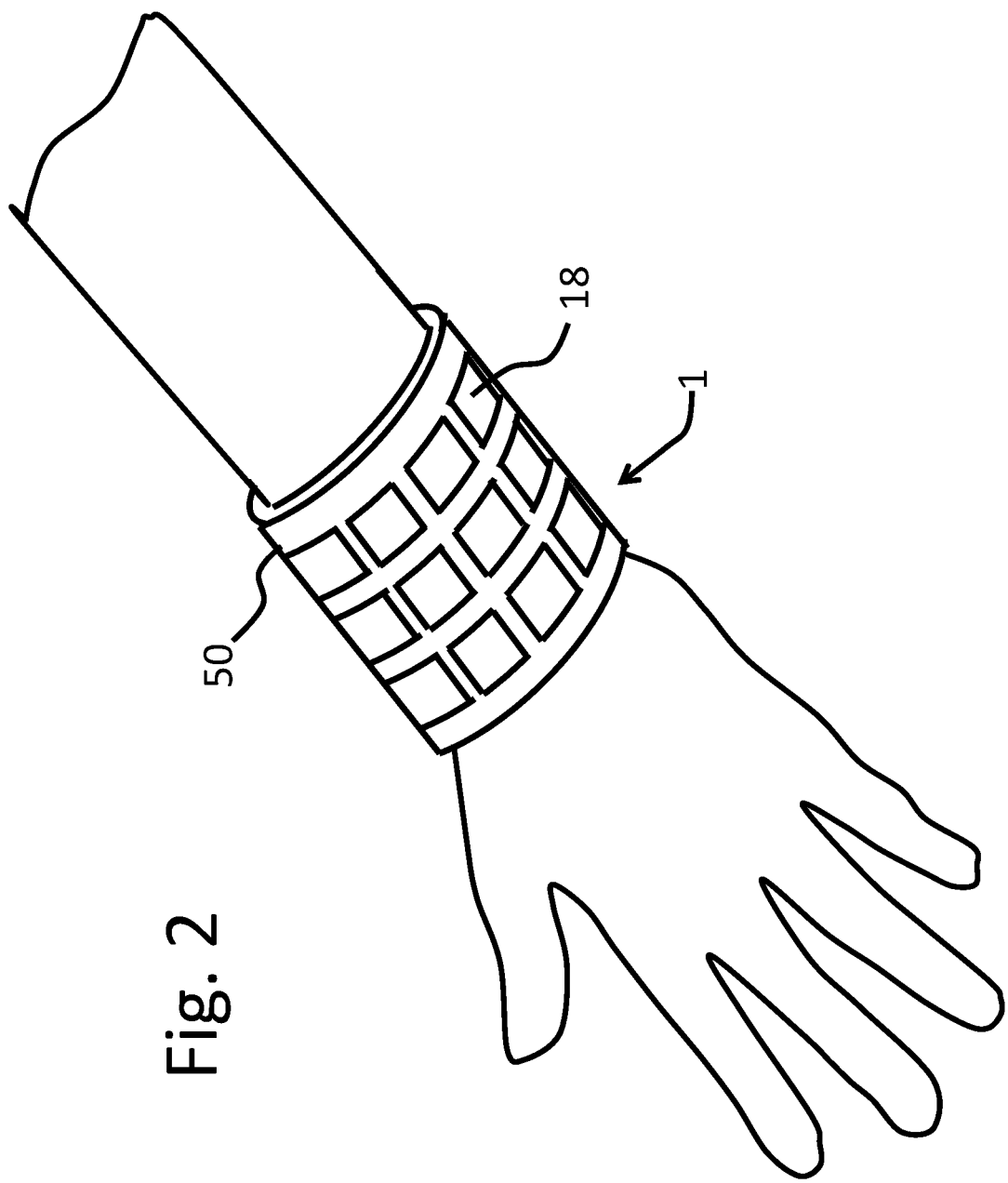
FIG. 2 is a perspective view of the steam concentration energy converter of FIG. 1 shown being worn by a person.

FIG. 2 illustrates the use of the steam concentration energy converter 1 to generate power using the water vapor partial pressure differential created by body perspiration relative to ambient air. Evaporation of moisture from a person's skin is a fairly continuous process. In this embodiment, the array of MEA cells 18 is incorporated into a housing in the form of apparel such as a wrist band 50. Moisture evaporation from the skin underneath the wrist band 50 creates a high water vapor partial pressure region relative to a lower water vapor partial pressure region on the opposite, ambient air exposed side. The steam concentration energy converter 1 performs as previously described under the pressure differential.

Figure 3:
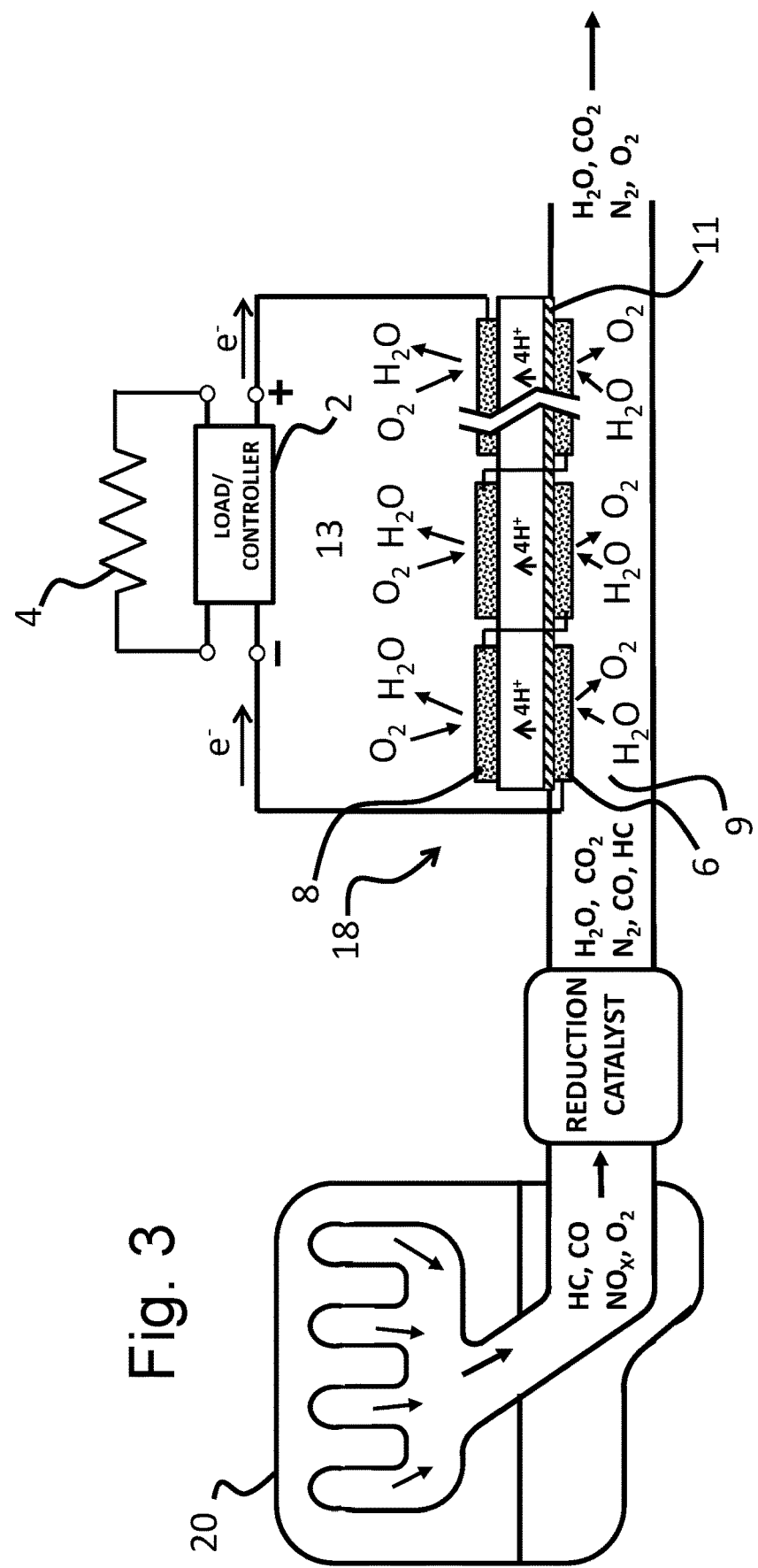
FIG. 3 is a schematic view of the steam concentration energy converter of FIG. 1 shown coupled to the exhaust of an engine.

FIG. 3 shows an embodiment of the steam concentration energy converter 1 where the array of MEA cells 18 is shown mounted in a housing comprising an internal combustion engine exhaust pipe or tube 20. Fossil fuel combustion exhaust comprises water ($H_2O$), carbon dioxide ($CO_2$), nitrogen ($N_2$), carbon monoxide (CO), and residual unburnt and partially burnt fuel (HC). The electric power generating reaction/reduction process through the array of MEA cells 18 is driven by the water vapor partial pressure differential as previously described. However, in this case, additional benefits occur. The oxygen released by water as it is electrolyzed in the electrode on the high water vapor partial pressure region or exhaust side is available to react with CO and HC in the exhaust resulting in these constituents being eliminated in favor of additional $H_2O$ and $CO_2$.

Figure 4:
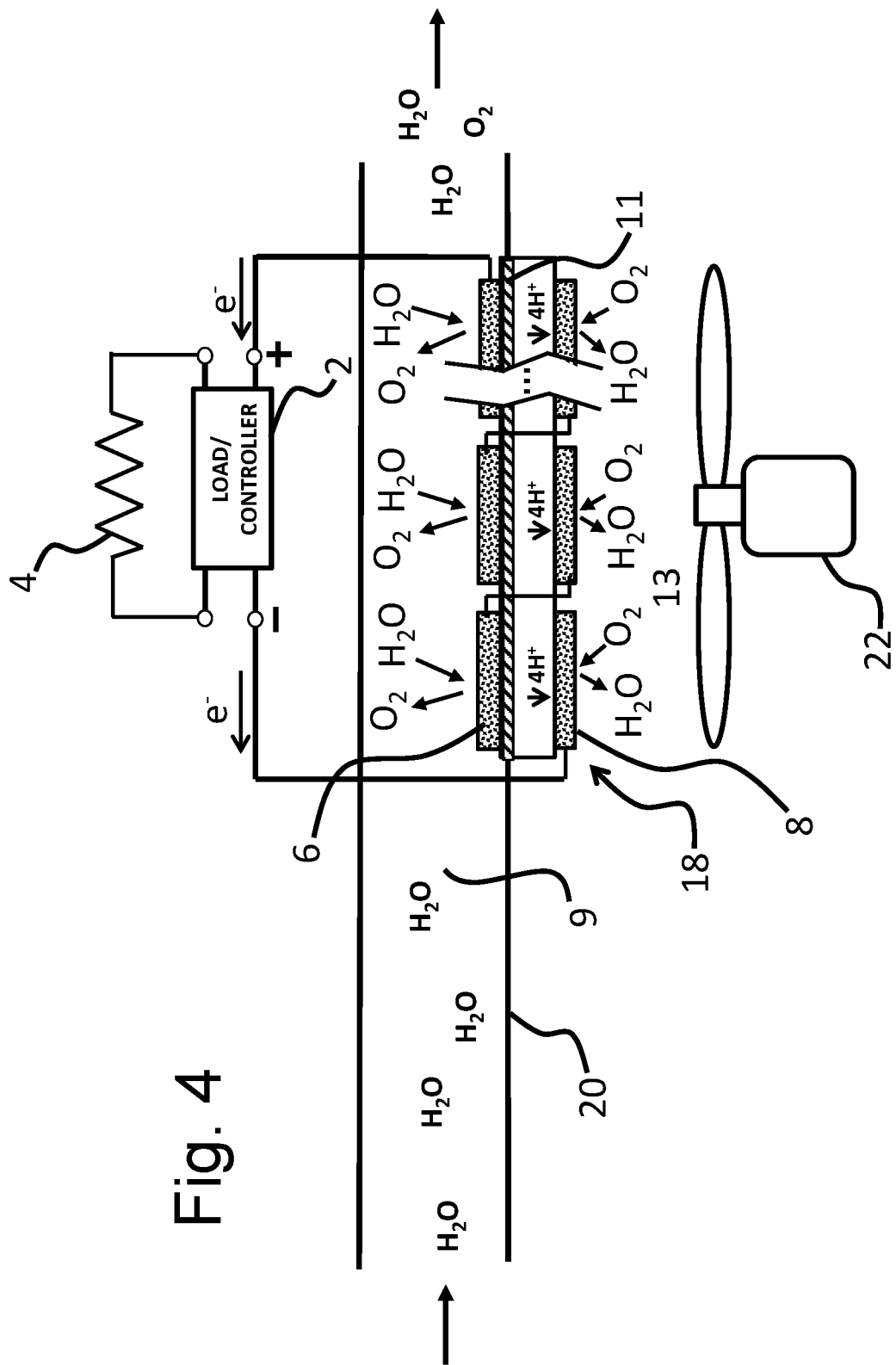
FIG. 4 is a schematic view of the steam concentration energy converter of FIG. 1 shown utilizing water evaporation.

FIG. 4 shows an embodiment of the steam concentration energy converter 1 wherein the array of MEA cells 18 is mounted in a housing in the form of a tube section for from which water evaporates. As liquid water flows through tube 20, a blower 22 forces and airstream or air across the exterior surface of the tube 20 to promote water evaporation and transport. The higher in vapor pressure of the water inside the tube relative to the partial water vapor pressure of the air flowing over its exterior drives the power generation process. The flow inside the tube 20 becomes a mixture of liquid water and oxygen as water is electrolyzed at the MEA cell electrodes 6 inside the tube 18, with oxygen being released into the flow and hydrogen ions being conducted through the proton conductive membrane 10. Electrons are routed through load/controller 2 and the individual MEA cells in the array in series such that electrons exit electrodes 6 enter electrodes 8. The protons and electrons react with ambient oxygen in electrodes 8 produce water which is subsequently released to the ambient air flowing over the exterior surface of tube 20. In this case given the phase change of the water, cell voltage is defined primarily by the evaporation entropy of water as:

$$\Delta V = \frac{\Delta S}{2F} = \frac{2500 \ J/g}{2F} = 0.233 \ V$$

Where ΔS is the heat of vaporization f water and F is Faraday's constant. The oxidation-reduction of water generates 1600 coulombs of electrons per gram as given by:

$$C = \frac{nAEm}{1 \ MW}$$

where n is the number of electrons involved in the process (2 per water molecule), A is Avogadro's number (6.02e23), E is the charge on a single electron (1.602e-19) and MW is the molecular weight water, 18 g. Substituting the values yields 1607 Coulombs per gram. At 0.233V, the resulting energy per gram of water evaporated from the tube is 374 Watt·sec/g which equivalent to 104 Wh of electricity per kg of water evaporated, (104 Wh/kg).

Figure 5:
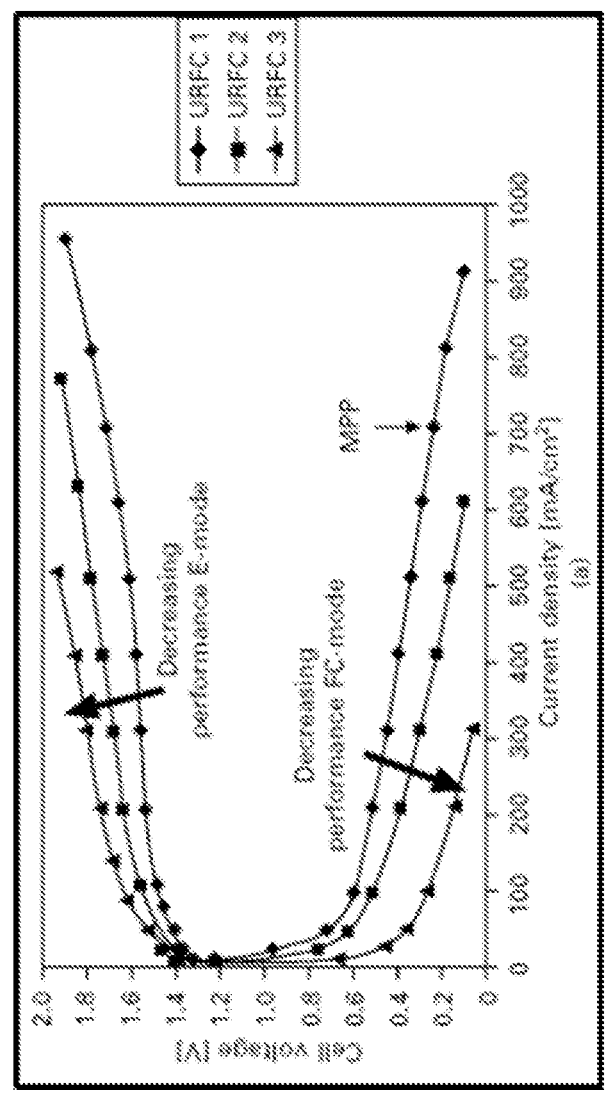
FIG. 5 is a graph showing the output current density for the steam concentration energy converter of FIG. 1.

As illustrated by FIG. 5, the output current density will be relatively low if the membrane electrode assembly (MEA cell 18) is to achieve the required approximation of a reversible process. As current draw increases the impedance and activation voltage losses for oxidizing and reducing water at the entering and exiting electrodes 6 and 8 respectively diverge from the open circuit voltage of the cell. At a very low current, the water heat of evaporation converted into electrical power would be almost equivalent to the heat of condensation input to return the water back to liquid. In an ideal system, the electrical power generated would be essentially equal to the heat input.

Prior art has generally taught concentration cells that require membranes that conducts ions of the gas for which the concentration differential applies. The present invention teaches the use canceling electrolyzing and reduction reactions as a means for extracting energy from a gas concentration differential. A membrane electrode assembly (MEA cell 18) comprising an ion conductive membrane sandwiched by a pair of electrodes separates volumes of gas having differing steam concentration levels and thereby different steam pressures or partial pressures. Steam enters an electrode on the high concentration side of the cell and is electrolyzed whereby oxygen is released and the resulting protons are conducted through the membrane to the opposite electrode. The electrons are routed through an external circuit or load to the opposite electrode where they recombine with the protons and react with oxygen in a reduction reaction producing water. Although hydrogen is not available in the system as a gas, the use of a membrane that is hydrogen ion conductive results in effective operation of the cell using steam as the concentration differential gas species. Multiple cells are configured in an array electrically connected in series to achieve useful voltage levels. A load controller monitors the voltage level and extracts current when voltage levels are sufficient to provide useful energy.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A steam concentration energy converter for generating electrical power from a water vapor pressure differential created between a high water vapor partial pressure region and a low water vapor partial pressure region, said steam concentration energy converter comprising:
    an electrical load controller;
    a housing, in the form of one of an internal combustion engine exhaust pipe or a tube with a blower creating an airstream over the tube, the housing at least partially separating the high water vapor partial pressure region from the low water vapor partial pressure region;
    an ion conductive membrane electrode assembly coupled to said housing and electrically coupled to said electrical load controller, said ion conductive membrane electrode assembly having a first electrode in fluid communication with a high water vapor partial pressure region, a second electrode in fluid communication with a lower water vapor partial pressure region, an ion conductive membrane positioned between said first electrode and said second electrode, and an ion conductive barrier layer configured to prevent the passage of molecular water through said ion conductive membrane electrode assembly, said first electrode oxidizing water within the high water vapor partial pressure region to produce protons and electrons wherein the protons are conducted through said ion conductive membrane and said ion conductive barrier to said second electrode and wherein the electrons are conducted through said electrical load controller to said second electrode.

2. The steam concentration energy converter of claim 1 wherein said ion conductive membrane is a proton conductive membrane.

3. The steam concentration energy converter of claim 1 wherein said first electrode includes a catalyst.

4. The steam concentration energy converter of claim 3 wherein said catalyst is platinum.

5. The steam concentration energy converter of claim 1 wherein said ion conductive membrane electrode assembly comprises a plurality of ion conductive membrane electrode assemblies coupled in series.

6. The steam concentration energy converter of claim 1 wherein said ion conductive barrier layer is a hydrogen permeable barrier layer.

7. A steam concentration energy converter for generating electrical power from a water vapor pressure differential comprising:
    a proton conductive membrane electrode assembly, said proton conductive membrane electrode assembly having a first electrode, a second electrode, an ion conductive membrane, sandwiched between said first and second electrodes, and an ion conductive barrier layer configured to prevent the passage of molecular water through said proton conductive membrane electrode assembly;

said first electrode being exposed to a first source of water vapor latent gas having a first water vapor partial pressure;

said second electrode being exposed to a second source of water vapor latent gas having a second water vapor partial pressure, said second water vapor partial pressure being less than said first water vapor partial pressure, said second source of water vapor latent gas including oxygen gas;

a housing, in the form of one of an internal combustion engine exhaust pipe or a tube with a blower creating an airstream over the tube, the housing at least partially separating the first source of water vapor latent gas and the second source of water vapor latent gas; and an electrical load/controller, said load/controller being connected between said first electrode and said second electrodes of said proton conductive membrane electrode assembly, whereby the load/controller extracts power from the proton conductive membrane electrode assembly as electrochemical reactions driven by the pressure difference between water entering the first electrode and exiting the second electrode, water vapor entering the first electrode from the first source of water vapor latent gas being oxidized into protons and electrons, the resulting oxygen being released back to the first source of water vapor latent gas and the protons being conducted through the membrane and the ion conductive barrier layer to the second electrode as the electrons are routed through the load/controller to the second electrode where the electrons react with oxygen to produce water, the water thus produced being released at the lower pressure of the second electrode.

8. The steam concentration energy converter of claim 7 wherein said first electrode includes a catalyst.

9. The steam concentration energy converter of claim 8 wherein said catalyst is platinum.

10. The steam concentration energy converter of claim 7 wherein said proton conductive membrane electrode assembly comprises a plurality of proton conductive membrane electrode assemblies coupled in series.

11. The steam concentration energy converter of claim 7 wherein said ion conductive barrier layer is a hydrogen permeable barrier layer.

12. A steam concentration energy converter for generating electrical power from a water vapor pressure differential comprising:

a proton conductive membrane electrode assembly, said proton conductive membrane electrode assembly having a first electrode, a second electrode, a hydrogen conductive membrane sandwiched between said first and second electrodes, and a hydrogen permeable barrier layer configured to prevent the passage of molecular water through said proton conductive membrane electrode assembly;

said first electrode being exposed to a first source of water vapor latent gas having a first water vapor partial pressure;

said second electrode being exposed to a second source of water vapor latent gas having a second water vapor partial pressure, said second water vapor partial pressure being less than said first water vapor partial pressure, said second source of water vapor latent gas including oxygen gas;

a housing, in the form of one of an internal combustion engine exhaust pipe or a tube with a blower creating an airstream over the tube, the housing at least partially separating the first source of water vapor latent gas and the second source of water vapor latent gas; and an electrical load/controller, said load/controller being connected between said first electrode and said second electrodes of said proton conductive membrane electrode assembly, whereby the load/controller extracts power from the proton conductive membrane electrode assembly as electrochemical reactions driven by the pressure difference between water entering the first electrode and exiting the second electrode, water vapor entering the first electrode from the first source of water vapor latent gas being oxidized into protons and electrons, the resulting oxygen being released back to the first source of water vapor latent gas and the protons being conducted through the membrane and the hydrogen permeable barrier layer to the second electrode as the electrons are routed through the load/controller to the second electrode where the electrons react with oxygen to produce water, the water thus produced being released at the lower pressure of the second electrode.

13. The steam concentration energy converter of claim 12 wherein said first electrode includes a catalyst.

14. The steam concentration energy converter of claim 13 wherein said catalyst is platinum.

15. The steam concentration energy converter of claim 12 wherein said proton conductive membrane electrode assembly comprises a plurality of proton conductive membrane electrode assemblies coupled in series.

\* \* \* \* \*